US007079959B2

(12) United States Patent
Bai et al.

(10) Patent No.: US 7,079,959 B2
(45) Date of Patent: Jul. 18, 2006

(54) HIGH-RESOLUTION INTELLIGENT ROTOR MACHINE DIAGNOSTIC SYSTEM AND METHOD

(75) Inventors: Ming-Sian Bai, Hsin-Chu (TW); Ming-Hung Hung, Tai-Nan (TW); Jia-Min Huang, Chang-Hua (TW); Fu-Cheng Su, Yun-Lin (TW)

(73) Assignee: National Chiao Tung University, Hsin-Chu (TW)

( * ) Notice: Subject to any disclaimer, the term of this patent is extended or adjusted under 35 U.S.C. 154(b) by 226 days.

(21) Appl. No.: 10/760,974

(22) Filed: Jan. 20, 2004

(65) Prior Publication Data
US 2005/0102116 A1 May 12, 2005

(30) Foreign Application Priority Data
Nov. 7, 2003 (TW) .............................. 92131228 A (51) Int. Cl.
*G06F 19/00* (2006.01)
(52) U.S. Cl. ........................................................ 702/56
(58) Field of Classification Search ...................... None
See application file for complete search history.

(56) References Cited

U.S. PATENT DOCUMENTS

| 4,924,420 | A | * | 5/1990 | Hadley et al. | ............... | 702/126 |
| 6,289,735 | B1 | * | 9/2001 | Dister et al. | ................... | 73/579 |
| 2002/0003743 | A1 | * | 1/2002 | Martone | ..................... | 375/262 |
| 2004/0130442 | A1 | * | 7/2004 | Breed et al. | ................. | 340/443 |

FOREIGN PATENT DOCUMENTS

| TW | 85102217 | 9/1996 |
| TW | 90120107 | 10/2002 |

OTHER PUBLICATIONS

Vold, H., Deel, J., "Vold-kalman Order Tracking: New Methods for Vehicles Sound Quality and Drive Train NVH Applications" Paper No. 972033, 1977.

Vold, H., Herlufsen, H., Gade, S., Konstantin-Hansen, H., "Characteristics of the Vold-Kalman Order Tracking Filter" Sound and Vibration, Apr. 1999.

Vold, H., Herlufsen, Mains, Corwin-Renner, "Multi Axle Order Tracking with the Vold-Kalman Tracking Filter" Sound and Vibration Magazine, 30-34, May 1997.

* cited by examiner

*Primary Examiner*—John Barlow
*Assistant Examiner*—Cindy Khuu
(74) *Attorney, Agent, or Firm*—Bucknam and Archer (57) ABSTRACT

The present invention relates to a smart system and method of performing high-resolution frequency order analysis/diagnosis on rotor, in which such system is characterized in that capable of performing order analysis via a Kalman filter or a RLS (Recursive Least Square) algorithm while determining the failure status based on the Fuzzy theory. The smart system of present invention comprises a data acquisition means, a bench data setup means, a STFT time-spectra analysis/re-sampled order tracking means, a Kalman filter or RLS algorithmic means, a fuzzy diagnosis means and a window interface (e.g., GUI) while repeatedly making use the functions of those means so as to achieve the real-time diagnosis on rotor.

4 Claims, 9 Drawing Sheets

HIGH-RESOLUTION INTELLIGENT ROTOR MACHINE DIAGNOSTIC SYSTEM AND METHOD

FIELD OF THE INVENTION

The present invention relates to a smart system and method of performing high-resolution frequency order analysis/diagnosis on rotor, characterized in that such system performs a real-time on-line frequency order diagnosis via a STFT (Short Time Fourier Transform) time-spectra analysis/re-sampled order tracking means, a Kalman filter or RLS algorithmic means, and a fuzzy diagnosis means.

RELATED ART

In the industrialization countries, there is relative high need on mechanical maintenance and diagnosis. Conventional mechanical maintenances are performed largely through failure restore, time-based maintenance and predictive maintenance. According to the result of analysis, performing the predictive maintenance provides the minimum loss in the system performance while increasing the yield and reducing the cost of production. As for the diagnosis technique, the conventional method relies on the instinct of a skilled technician to provide a predictive maintenance while the modern method relies on diagnosis mechanism.

As disclosed in the official gazette of R.O.C. patent no. 505781 of title "Device for Vibration Diagnosis on Shaft" issued at Oct. 11, 2002, a vibration diagnosis device comprises a detection unit, an algorithmic processing unit, a display unit and a power generation unit. Such device is mainly used to monitor the status of a shaft and to evaluate the degree of failure in accordance with a preset alarm value based on the variation of acoustic pressure in impact pulses. The characteristic of such diagnosis device is in that taking the pivot rotation as the source to supply the power need of the device.

As disclosed in the official gazette of R.O.C. patent no. 286359 of title "Method of performing vibration diagnosis on degradation and failure of roller rotation mechanism" issued at Sep. 21, 1996, the analysis is performed in the following steps: (a) measuring the vibration signal of a roller; (b) determining whether the measured signal is greater than said alarm value, if not, display a message of normal status and end the process, if yes, then continue the process of analysis; (c) determining whether the wave height ratio is greater than 4.5, if not, move the process to step (d), if yes, move the process to step (e); where in step (d) calculating the central frequency through spectra transformation while outputting the central frequency fall between the upper and lower limit of said alarm value and ending the process; and in step (e) finding the repetition frequency of impact pulses so as to compare with the characteristic value of failure while outputting the result and ending the process.

As disclosed in U.S. Pat. No. 6,289,735 of title "Mechanical diagnosis system and method used for vibration analysis", more than one sensors are used to conduct the vibration measurement. Firstly, determining the position of the critical frequency and the resonance frequency of a bench by comparing the relative magnitude between each harmonic, and then identifying the adjacent harmonics based on said critical frequency while evaluating the status of the bench via a neural network and an expert system.

However, the prior technique has the following disadvantage: (1) limitation applied to the resolution and status analyzing conducted through a conventional method of order analysis based on Fourier transform; (2) current order analysis based on the Kalman filter is conducted under off-line condition; (3) such diagnosis technique is conducted in accordance with a time- or frequency-based alarm value therefore it is impossible to achieve an effective diagnosis on complicated failure states; and (4) such technique relies completely on an highly experienced technician to conduct a post-result judgment on the process.

Therefore, to improve the above disadvantage, it is necessary to develop a method capable of performing on-line measurement so as to conduct the diagnosis and failure analysis on complicated states.

SUMMARY OF THE INVENTION

Based on the problem encountered in the prior art, an object of present invention is to provide a smart system and method of performing high-resolution frequency order analysis/diagnosis on rotor.

The high-resolution frequency order analysis/diagnosis system of present invention comprises: (a) a data acquisition means, for measuring the vibration signal and tacho signal of a rotor; (b) a bench data setup means, for creating fundamental data of the bench in accordance with the measured vibration signal and tacho signal of the rotor as well as the characteristic of the bench itself; (c) a STFT (Short Time Fourier Transform) time-spectra analysis/re-sampled order tracking means, for obtaining the primary data of the frequency distribution for rotor operated in non-constant tacho by conducting a short-time Fourier transformed (STFT) time-spectra analysis and re-sampled order tracking in accordance with measured vibration signal and tacho signal; (d) a Kalman filter or RLS algorithmic means, for obtaining a high-resolution frequency order energy distribution of on-line updateable type by a model based Kalman filter frequency order analysis technique using the measured vibration signal and tacho signal as input data and parameters setup by the computation result of the time-spectra analysis and re-sampled order analysis; (e) a fuzzy diagnosis means, for incorporating frequency order energy distribution calculated by the Kalman filter or RLS algorithmic means with data created by the bench data setup means to achieve a fuzzy diagnosis conclusion in accordance with a preset fuzzy diagnosis logic; and (f) a window interface (e.g., GUI), for outputting a diagnosis of failure type and order information in accordance with the fuzzy diagnosis conclusion achieve by the fuzzy diagnosis means; while repeatedly making use the functions of those means so as to achieve the real-time diagnosis on rotor. Also, the fuzzy diagnosis means is adaptive to different bench so as to have different result on fuzzy relationship and alarm value.

In another viewpoint, the above diagnosis system may use an analysis means of RLS (Recursive Least Square) algorithmic type instead of an analysis means of the Kalman filter type. Said RLS algorithmic means can obtain a high-resolution frequency order energy distribution of on-line updateable type by a model based Kalman filter frequency order analysis technique using the measured vibration signal and tacho signal.

The high-resolution frequency order analysis/diagnosis method of present invention comprises the following steps: (a) measuring the vibration signal of a rotor apparatus; (b) creating fundamental data of the bench in accordance with the vibration signal and tacho signal measured in step (a) as well as the bench characteristic of the rotor; (c) obtaining the primary data of frequency distribution of a rotor operated in non-constant tacho by conducting a short-time Fourier transformed (STFT) time-spectra analysis and re-sampled order tracking in accordance with the measured vibration signal and tacho signal; (d) obtaining a high-resolution frequency order energy distribution of on-line updateable type by a model based Kalman filter frequency order analysis technique using the vibration signal and tacho signal measured in step (a) and parameters generated from the computation result of step (b); (e) incorporating frequency order energy distribution calculated in step (d) with data created in step (b) to achieve a fuzzy diagnosis conclusion in accordance with a preset fuzzy diagnosis logic; and (f) outputting a diagnosis of failure type and order information in accordance with the fuzzy diagnosis conclusion draw from step (e); while repeatedly conducting steps (a), (d), (e) and (f) so as to achieve the real-time diagnosis on rotor. Also, the fuzzy diagnosis conducted in step (e) is adaptive to different bench so as to have different result on fuzzy relationship and alarm value.

In another viewpoint, the above diagnosis system may use an analysis means of RLS (Recursive Least Square) algorithmic type instead of an analysis means of said Kalman filter type. The RLS algorithm can obtain a high-resolution frequency order energy distribution of on-line updateable type by a model based Kalman filter frequency order analysis technique using the measured vibration signal and tacho signal.

DETAILED DESCRIPTION OF THE INVENTION

In the following context, the detailed description on the preferred embodiment of present invention will be given with reference to the attached figures, in which similar parts are denoted with same reference numbers.

The object of present invention is to provide a smart system and method of performing high-resolution frequency order analysis and diagnosis on rotor apparatus. The rotor apparatus generally refers to a rotary mechanical system such as car engine, rotor set of power generator, machining bench (e.g., lathe), power system of ship and etc.

The high-resolution frequency order analysis/diagnosis smart system of present invention is constituted of several means with different function as follows:

(a) a data acquisition means 1, for measuring the vibration signal and tacho signal of a rotor; in one embodiment, the data acquisition means comprises components such as a accelerating gauge for measuring the vibration signal of a rotor in rotary apparatus, a fiber trigger sensor for recording the variation of tacho on rotor, a digital signal processing card for processing data from said accelerating gauge and said fiber trigger sensor so as to calculate therefrom an estimated tacho;

(b) a bench data setup means 2, for creating fundamental data of the bench in accordance with the measured vibration signal and tacho signal of the rotor as well as the characteristic of the bench itself; in one embodiment, data including fuzzy measurement and fuzzy relation are created for the fuzzy diagnosis of failure at the late stage;

(c) a STFT time-spectra analysis/re-sampled order tracking means 3, for obtaining the primary data of frequency distribution for rotor operated in non-constant tacho by conducting a short-time Fourier transformed (STFT) time-spectra analysis and re-sampled order tracking in accordance with the measured vibration signal and tacho signal;

(d) a Kalman filter or RLS algorithmic means 4, for obtaining a high-resolution frequency order energy distribution of on-line updateable type by a model based Kalman filter frequency order analysis technique using the measured vibration signal and tacho signal as input data and parameters setup by the computation result of the time-spectra analysis and re-sampled order tracking; in comparison with prior technology, it is advantageous that such means is capable of providing a high-resolution on-line display for the diagnosis result;

(e) a fuzzy diagnosis means 5, for incorporating frequency order energy distribution calculated by the Kalman filter or RLS algorithmic means with data created by the bench data setup means to achieve a fuzzy diagnosis conclusion in accordance with a preset fuzzy diagnosis logic; in one embodiment, incorporating the frequency order energy distribution calculated by the Kalman filter or RLS algorithmic means 4 with data created by the bench data setup means 2 to achieve a fuzzy diagnosis conclusion in accordance with a preset fuzzy diagnosis logic;

(f) a window interface (e.g., GUI) means 6, constituted of a personal computer (PC) having GUI software installed therein for outputting a diagnosis of failure type and order information in accordance with the fuzzy diagnosis conclusion achieve by the fuzzy diagnosis means 5; the execution of said GUI software in PC can also play the role of parameter input interface other than a diagnosis result output means, that is to the such GUI means 6 is actually a man-to-machine interface (MMI).

By repeatedly making use the functions of those means, it is possible for said system to provide the on-line display/update for the dynamic operating characteristic of the tested rotor so as to achieve the real-time diagnosis on rotor.

In another embodiment, the above diagnosis system may use an analysis means of RLS (Recursive Least Square) algorithmic type instead of an analysis means of the Kalman filter type. Said RLS algorithmic means can obtain a high-resolution frequency order energy distribution of on-line updateable type by a model based Kalman filter frequency order analysis technique using the measured vibration signal and tacho signal.

The high-resolution frequency order analysis/diagnosis method of present invention comprises the following steps:

(a) measuring the vibration signal of a rotor apparatus;

(b) creating fundamental data of the bench in accordance with the vibration signal and tacho signal measured in step (a) as well as the characteristic of the bench itself;

(c) obtaining the primary data of frequency distribution for rotor operated in non-constant tacho by conducting a short-time Fourier transformed (STFT) time-spectra analysis and re-sampled order tracking in accordance with the measured vibration signal and tacho signal;

(d) obtaining a high-resolution frequency order energy distribution of on-line updateable type by a model based Kalman filter frequency order analysis technique using the vibration signal and tacho signal measured in step (a) and parameters generated from the computation result of step (b);

(e) incorporating frequency order energy distribution calculated in step (d) with data created in step (b) to achieve a fuzzy diagnosis conclusion in accordance with a preset fuzzy diagnosis logic; and (f) outputting a diagnosis of failure type and order information in accordance with the fuzzy diagnosis conclusion draw from step (e); while repeatedly conducting steps (a), (d), (e) and (f) so as to achieve the real-time diagnosis on rotor. In another embodiment, the diagnosis system may use a RLS (Recursive Least Square) algorithmic analysis instead of said Kalman filter analysis performed in step (d). In comparison with the prior technology, it is advantageous for the possibility of obtaining a high-resolution frequency order energy distribution of on-line updateable type by a model based Kalman filter frequency order analysis technique using the measured vibration signal and tacho signal.

Figure 1:
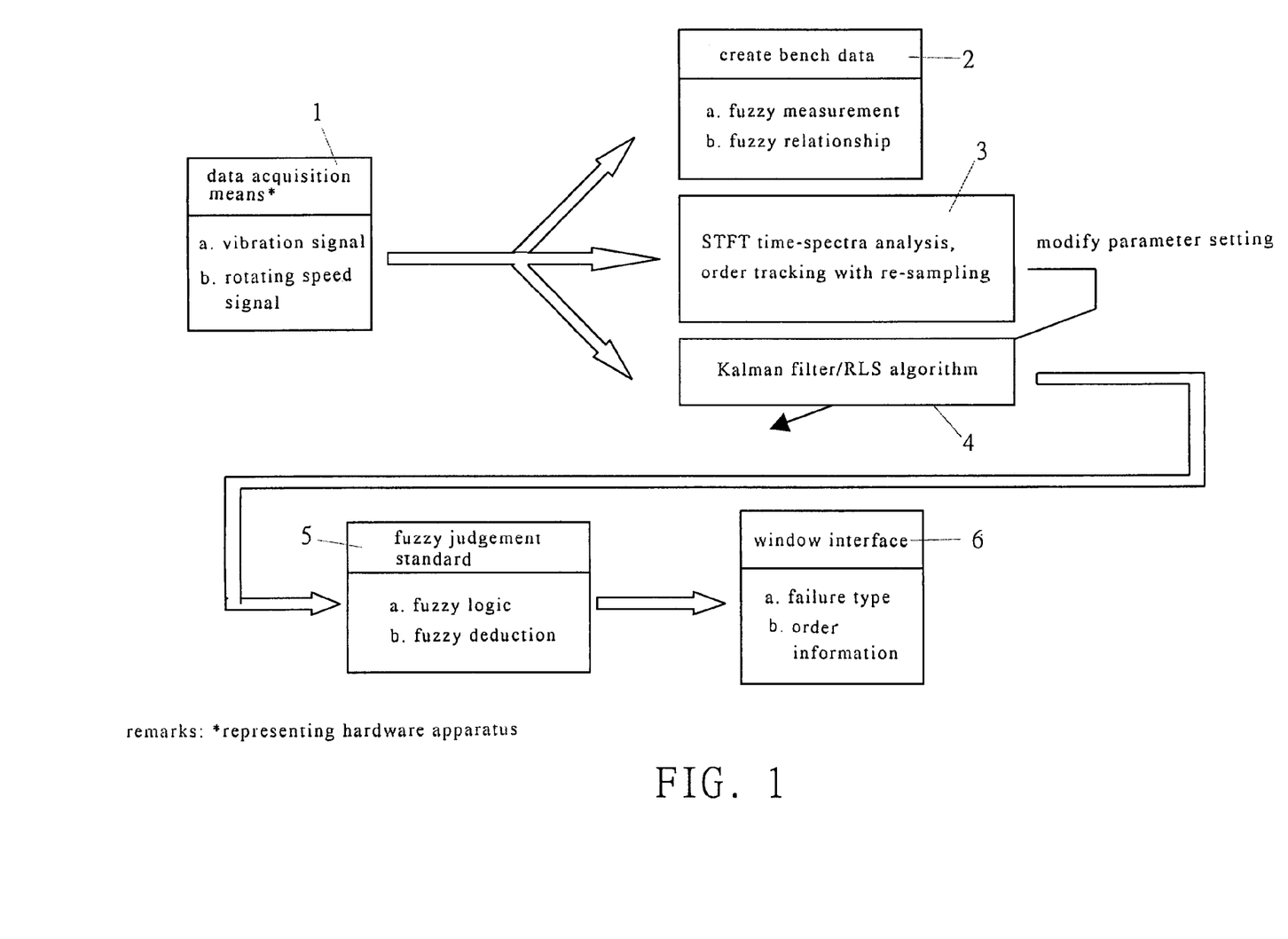
FIG. 1 is a flow chart showing a method of performing diagnosis on rotor system in accordance with an embodiment of present invention.

Now refer to FIG. 1, it is a flow chart showing the method of performing high-resolution order analysis/diagnosis on rotor. To conduct such method, the present invention provides a system comprises: a data acquisition means 1, for measuring the vibration signal and tacho signal of a rotor; a bench data setup means 2, for creating fundamental data of the bench in accordance with measured vibration signal and tacho signal of the rotor as well as the characteristic of the bench itself; a STFT time-spectra analysis/re-sampled order tracking means 3, for conducting a short-time Fourier transformed (STFT) time-spectra analysis and re-sampled order tracking; a Kalman filter or RLS algorithmic means 4, including a Kalman filter and a RLS algorithm; (e) a fuzzy diagnosis means 5, including a fuzzy logic unit and a fuzzy deduction unit to achieve the fuzzy diagnosis standard; and (f) a window interface (e.g., GUI), for outputting a diagnosis of failure type and order information. While by repeatedly conducting those diagnosis steps, it is then possible to achieve the object of present invention.

Figure 2:
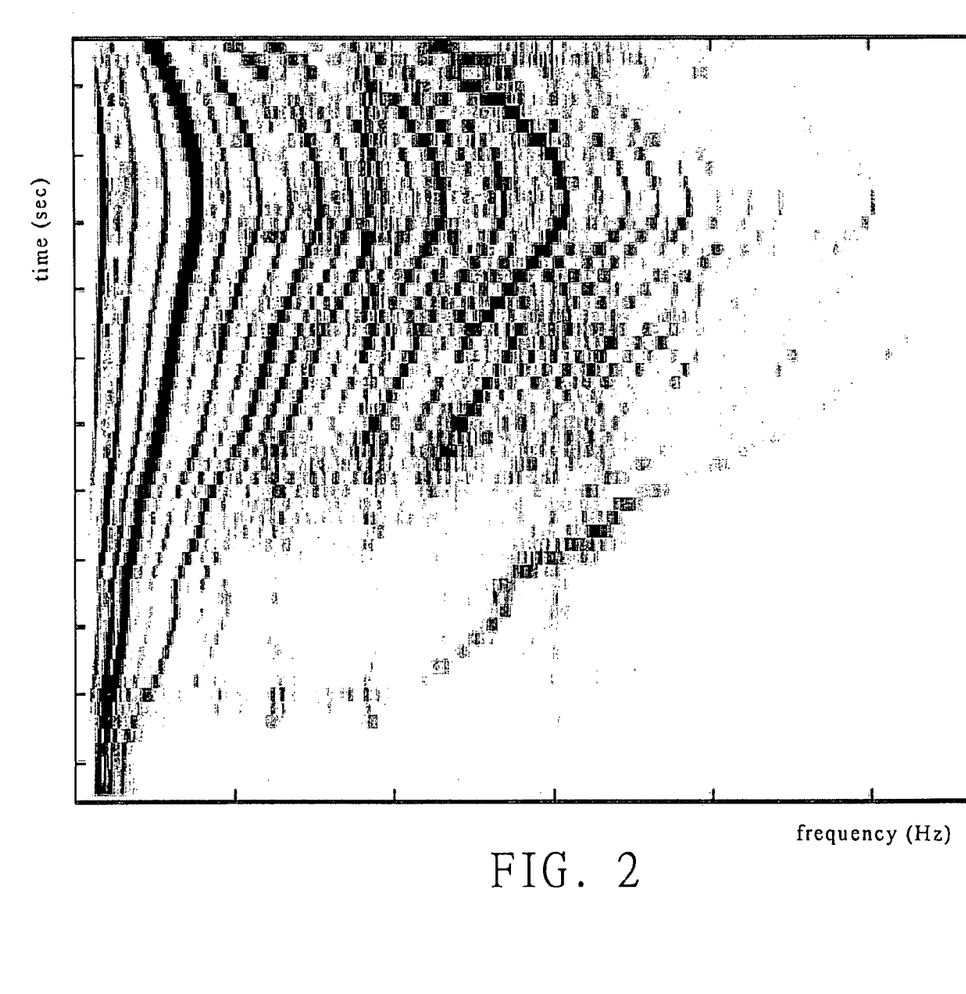
FIG. 2 is a diagram showing the order energy distribution obtained from a method of analysis in accordance with prior art.
Figure 3:
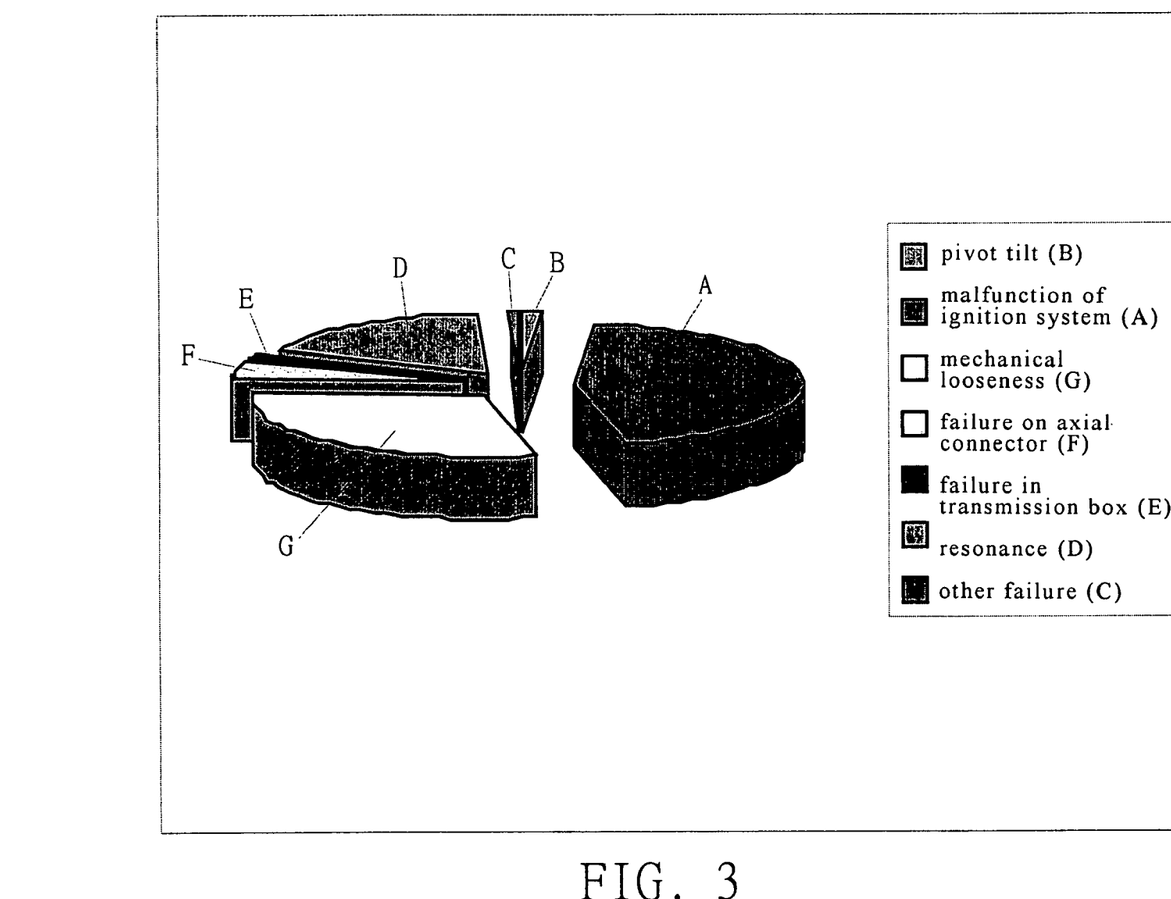
FIG. 3 is a diagram showing the result of diagnosis determined by the method shown in FIG. 2.

As shown in FIG. 2-5, the test result of a four-stroke car engine under a condition with single cylinder failed to be ignited. In FIG. 2, showing the order energy distribution obtained by a prior technique based on STFT, while the diagnosis of such data is given in FIG. 3.

Figure 4:
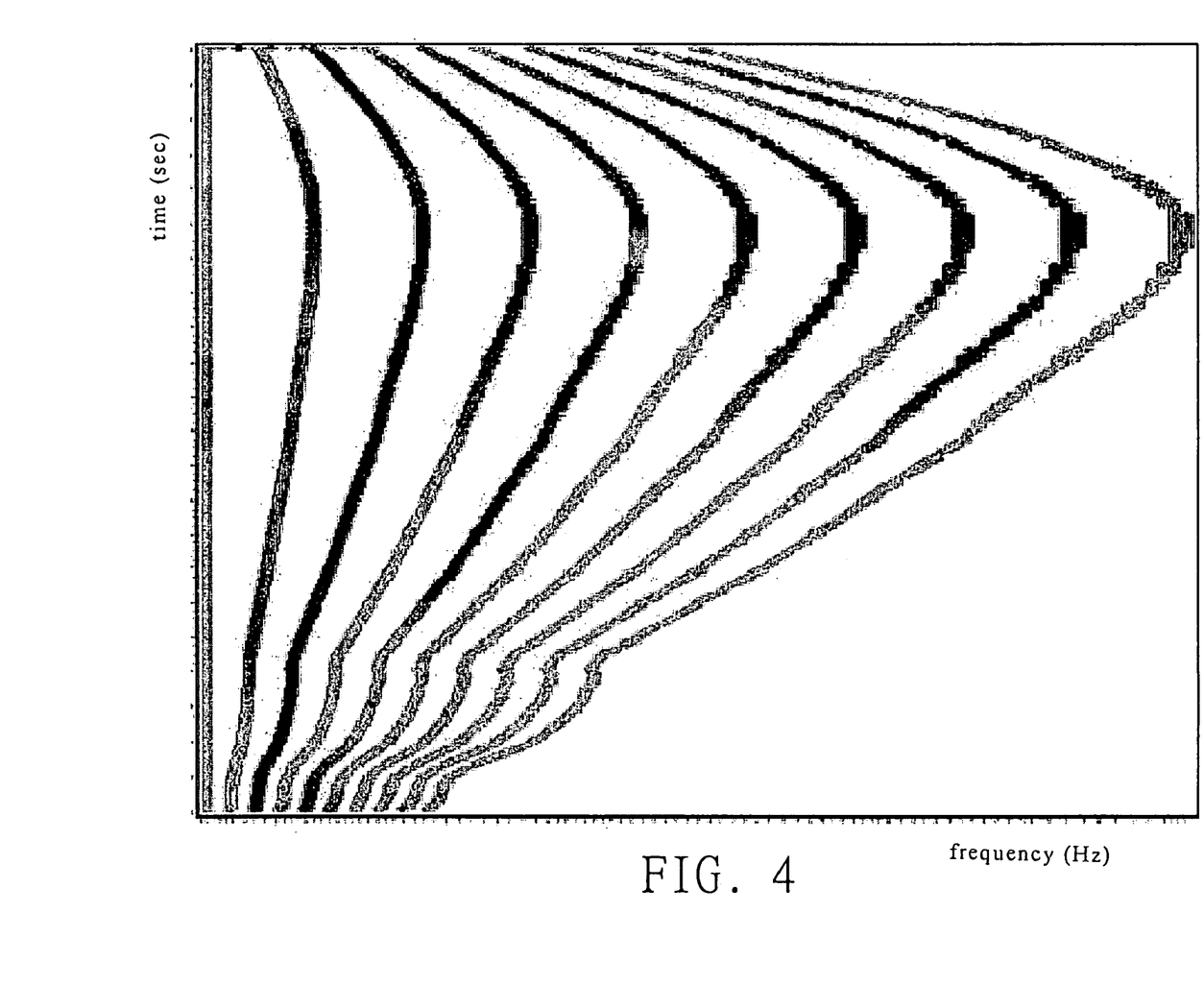
FIG. 4 is a diagram showing the order energy distribution obtained from a method of analysis in accordance with present invention.
Figure 5:
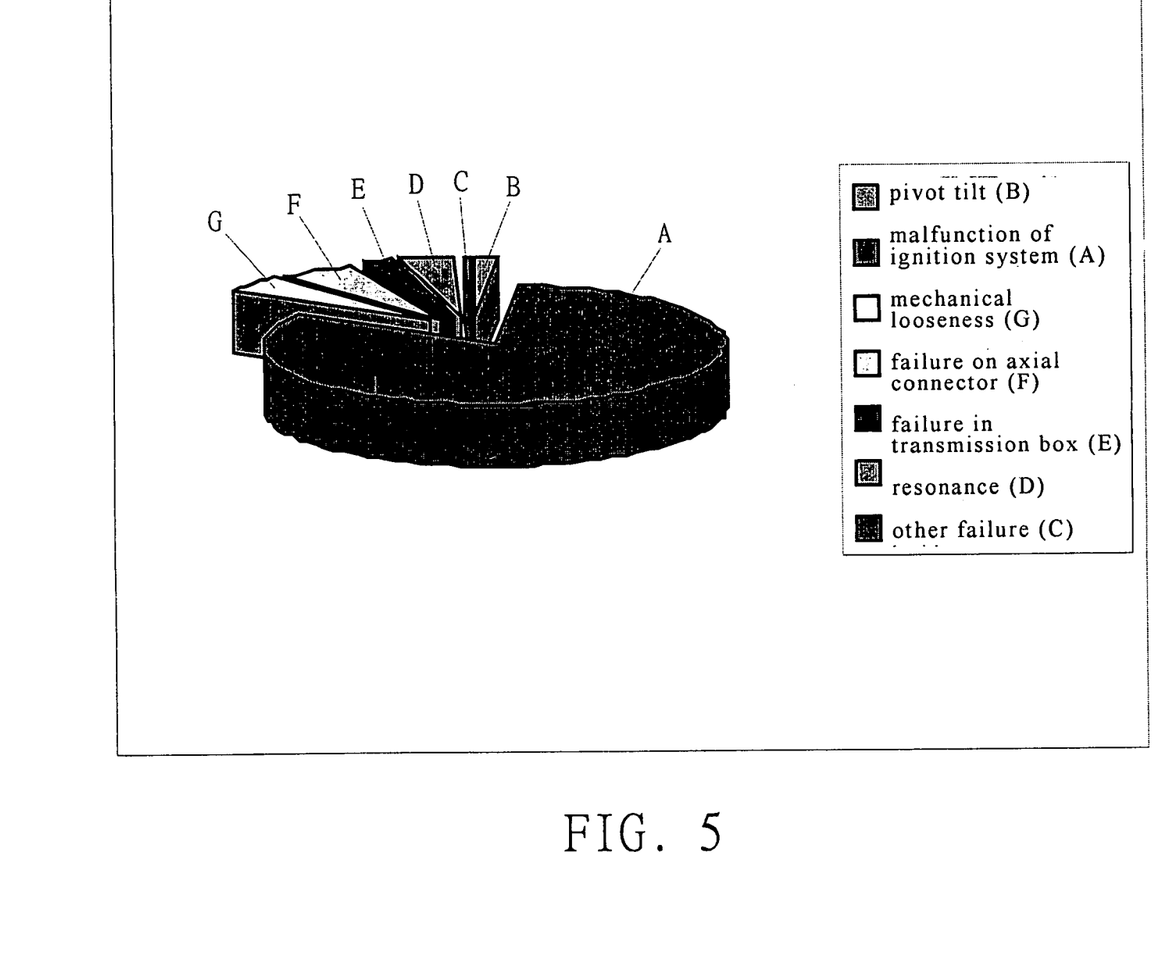
FIG. 5 is a diagram showing the result of diagnosis determined by the method shown in FIG. 4.
Figure 6:
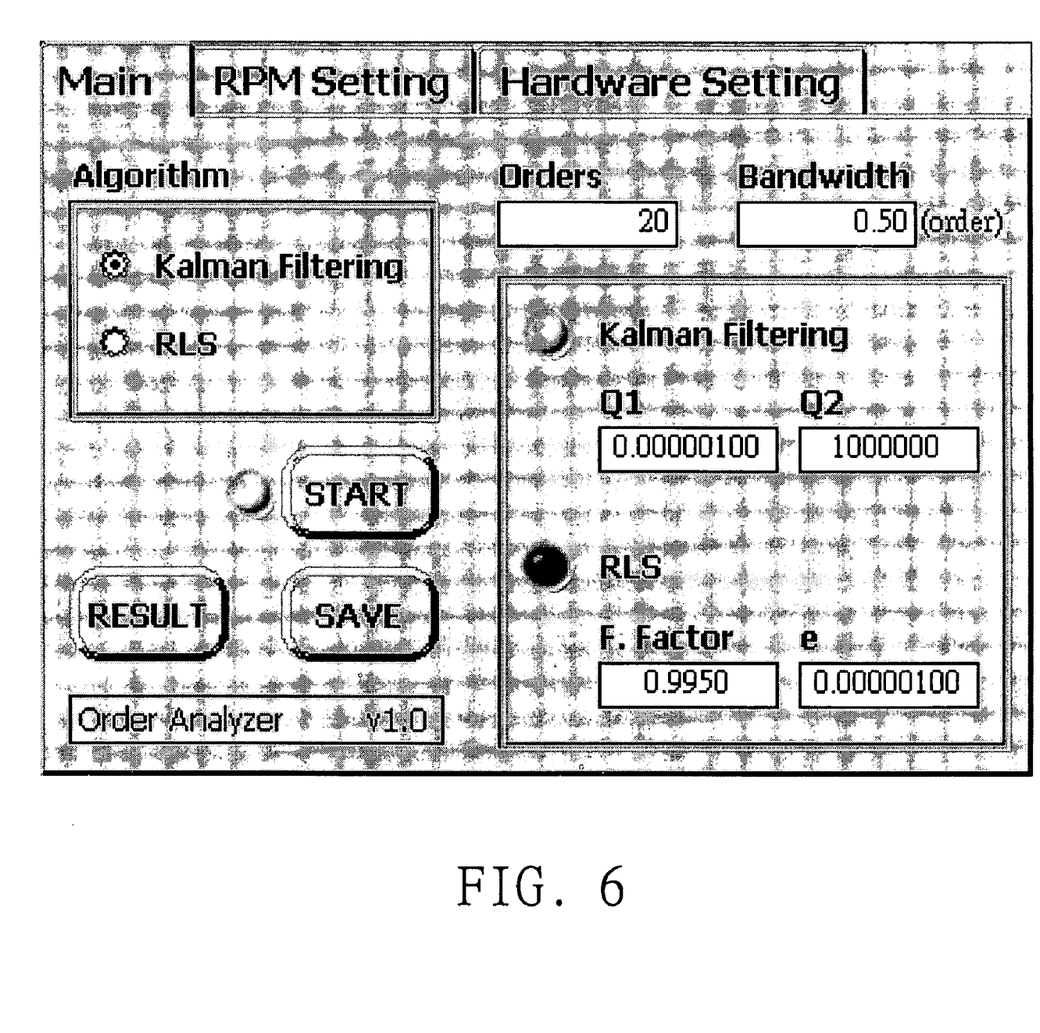
FIG. 6 and FIG. 7 are diagrams showing the parameter setup screen of window interface.
Figure 7:
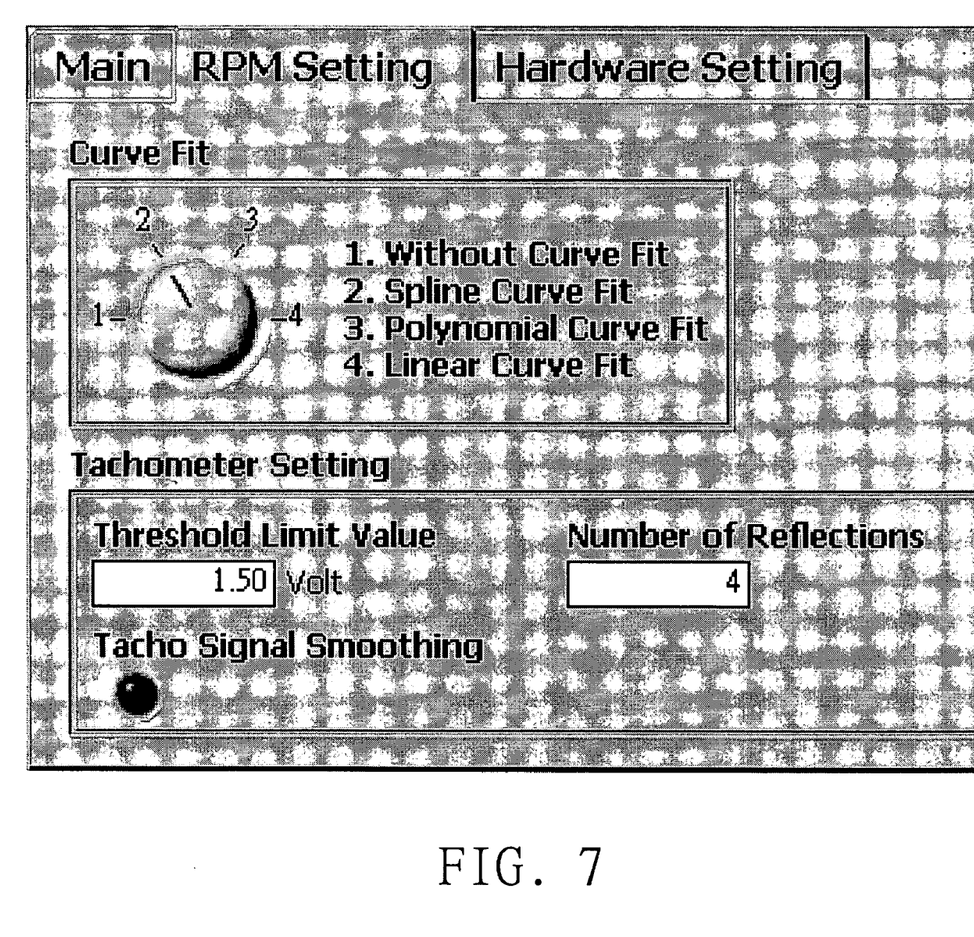
Figure 8:
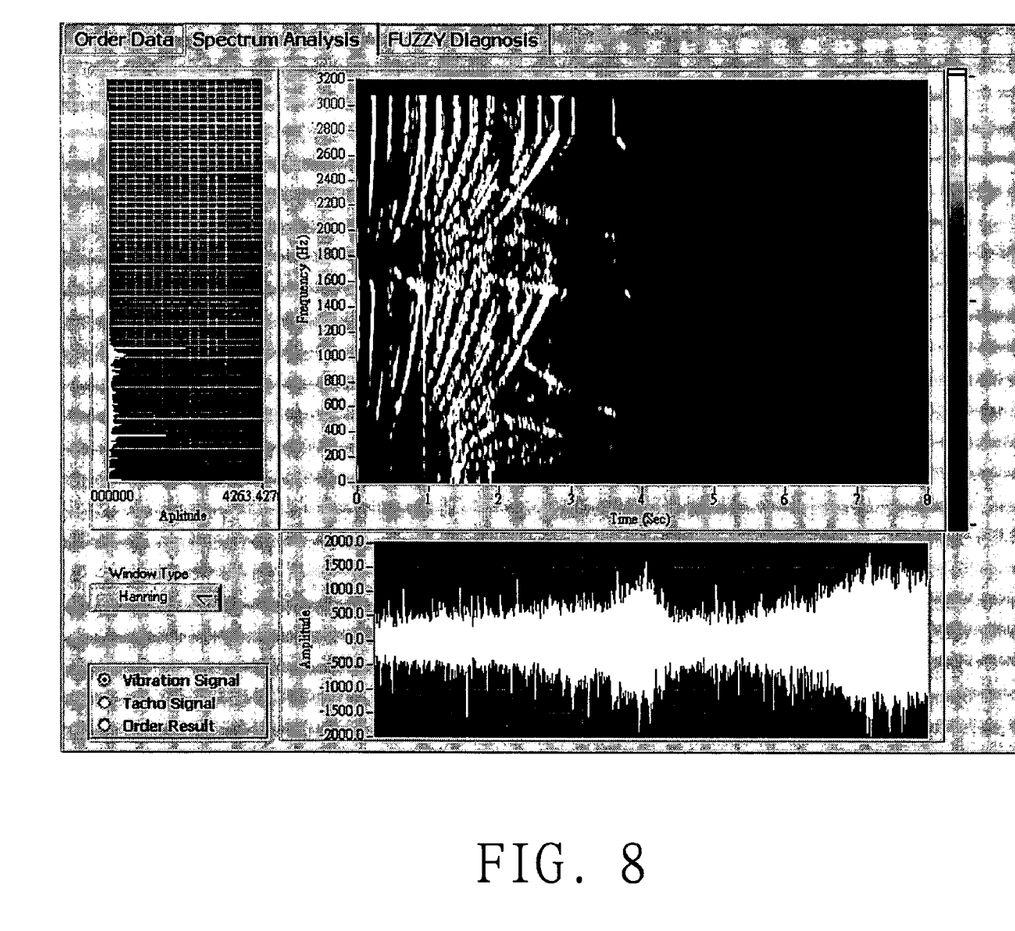
FIG. 8 is a diagram showing a result-display screen of window interface.
Figure 9:
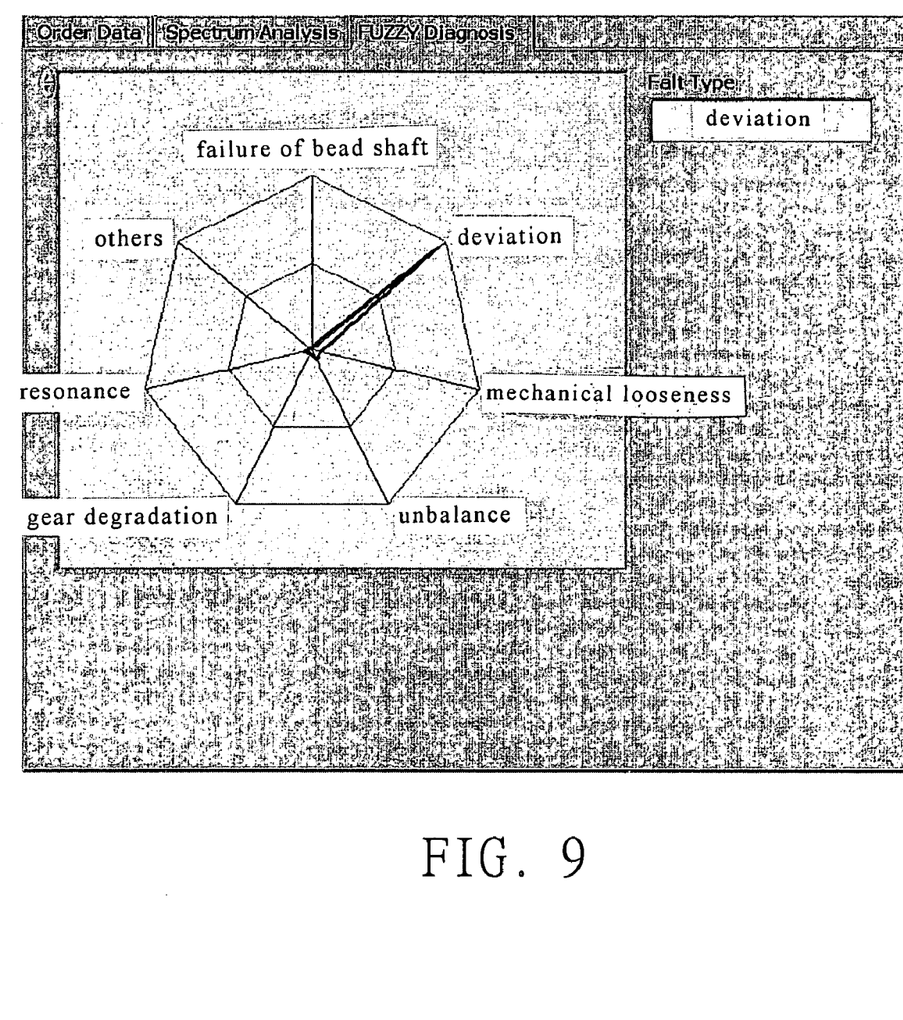
FIG. 9 is a diagram showing the failure diagnosis screen of a window interface.

On the other hand, it is shown in FIG. 4 the order energy distribution obtained by performing Kalman filter algorithm, while the diagnosis of such data is given in FIG. 5. By comparing the diagnosis results of FIG. 3 and FIG. 5 under the same failure condition, it can be seen that a much clear and more precise order energy distribution is obtained by performing high-resolution frequency order analysis/diagnosis of present invention in comparison to the result obtained from prior technique. FIG. 6 and FIG. 7 are diagrams showing the parameter setup screen of window interface. FIG. 8 is a diagram showing a result-display screen of window interface. FIG. 9 is a diagram showing the failure diagnosis screen of a window interface.

Those who skilled in this technique will understand that above described are preferred embodiments of present invention but not intended to be the limit of the invention. It should be noted that various modification and change of the embodiment and its equivalence is considered to fall within claims as follows:

DESCRIPTION OF SYMBOL

| numeral | elements |
| --- | --- |
| 1 | data acquisition means |
| 2 | station data setup means |
| 3 | STFT time-spectra analysis/re-sampled order tracking means |
| 4 | Kalman filter or RLS algorithmic means |
| 5 | fuzzy diagnosis means |
| 6 | window interface |

What is claimed is:

1. A high-resolution frequency order analysis/diagnosis smart system for rotor, comprising:
 (a) a data acquisition means, for measuring the vibration signal and tacho signal of a rotor;
 (b) a bench data setup means, for creating fundamental data of the bench in accordance with the measured vibration signal and tacho signal of the rotor as well as the characteristic of the bench itself;
 (c) a STFT time-spectra analysis/re-sampled order tracking means, for obtaining the primary data of the frequency distribution for rotor operated in non-constant tacho by conducting a short-time Fourier transformed (STFT) time-spectra analysis and re-sampled order tracking in accordance with measured vibration signal and tacho signal;
 (d) a Kalman filter means, for obtaining a high-resolution frequency order energy distribution of on-line updateable type by a model based Kalman filter frequency order analysis technique using the measured vibration signal and tacho signal as input data and parameters setup by the computation result of the time-spectra analysis and re-sampled order tracking;
 e) a fuzzy diagnosis means, for incorporating frequency order energy distribution calculated by the Kalman filter or RLS algorithmic means with data created by the bench data setup means to achieve a fuzzy diagnosis conclusion in accordance with a preset fuzzy diagnosis logic;
 (f) a window interface (e.g., GUI), for outputting a diagnosis of failure type and order information in accordance with the fuzzy diagnosis conclusion achieve by said fuzzy diagnosis means; and
 (g) By repeatedly making use the functions of those means, it is possible for such system to achieve the real-time diagnosis on rotor.

2. The system as set forth in claim 1, wherein said fuzzy diagnosis means is adaptive to different bench so as to have different result on fuzzy relationship and alarm value.

3. A method of performing high-resolution frequency order analysis/diagnosis on rotor, comprising following steps of:
 (a) measuring the vibration signal of a rotor apparatus;
 (b) creating fundamental data of the bench in accordance with the vibration signal and tacho signal measured in step (a) as well as the characteristic of the bench itself;
 (c) obtaining the primary data of frequency distribution for rotor operated in non-constant tacho by conducting a short-time Fourier transformed (STFT) time-spectra analysis and re-sampled order tracking in accordance with the measured vibration signal and tacho signal;

(d) obtaining a high-resolution frequency order energy distribution of on-line updateable type by a model based Kalman filter frequency order analysis technique using the vibration signal and tacho signal measured in step (a) and parameters generated from the computation result of step (b) ;

(e) incorporating frequency order energy distribution calculated in step (d) with data created in step (b) to achieve a fuzzy diagnosis conclusion in accordance with a preset fuzzy diagnosis logic;

(f) outputting a diagnosis of failure type and order information in accordance with the fuzzy diagnosis conclusion draw from step (e); and (g) By repeatedly making use the functions of those means, it is possible for such method to achieve the real-time diagnosis on rotor.

4. The method as set forth in claim 3, wherein said fuzzy diagnosis conducted in step (e) is adaptive to different bench so as to have different result on fuzzy relationship and alarm value.

* * * * *